United States Patent [19]

Jung et al.

[11] 3,753,548

[45] Aug. 21, 1973

[54] PIVOT VALVE AND SEALING SLEEVE CONSTRUCTION

[75] Inventors: Richard Jung, Gummersbach in der Delle; Eugen Markus, Gummersbach, both of Germany

[73] Assignee: L. & C. Steinmuller GmbH, Gummersbach, Germany

[22] Filed: Aug. 16, 1971

[21] Appl. No.: 172,017

[30] Foreign Application Priority Data
Sept. 9, 1970   Germany.................. P 20 47 413.8

[52] U.S. Cl............................... 251/305, 251/306
[51] Int. Cl.............................................. F16k 1/22
[58] Field of Search.................... 251/173, 305, 306

[56] References Cited
UNITED STATES PATENTS

| | | | |
|---|---|---|---|
| 3,153,427 | 10/1964 | Burtis............................. | 251/173 X |
| 3,129,920 | 4/1964 | Stillwagon...................... | 251/306 X |
| 2,059,656 | 11/1936 | Ring................................ | 251/173 |
| 3,078,069 | 2/1963 | Broadbent ...................... | 251/173 |
| 3,640,499 | 2/1972 | Jung............................... | 251/305 |

FOREIGN PATENTS OR APPLICATIONS

| | | | |
|---|---|---|---|
| 1,181,609 | 6/1959 | France............................. | 251/306 |
| 811,551 | 4/1959 | Great Britain..................... | 251/306 |
| 1,472,745 | 1/1967 | France............................. | 251/305 |

*Primary Examiner*—Alan Cohan
*Assistant Examiner*—Gerald A. Michalsky
*Attorney*—John J. McGlew et al.

[57] ABSTRACT

A device for sealing a duct includes a sleeve made of a deformable material which is secured in the duct passage in a manner such that it forms an annular space with the interior wall of the passage. The assembly includes a pivoted flap which is journaled in a side bearing of the duct and the size of the flap is such that it moves into a wedging sealing engagement with the deformable insert. The inner circumference of the insert is slightly smaller than the circumference of the valve flap. The valve flap includes a shaft which is supported on a connecting web which is located on the downstream side of the flap which is remote from the portion of the insert which is secured within a recess of the outer wall of the conduit.

2 Claims, 2 Drawing Figures

Patented Aug. 21, 1973

3,753,548

INVENTORS
RICHARD JUNG
FUGEN MARKUS

BY
John J. McGlew
ATTORNEY

PIVOT VALVE AND SEALING SLEEVE CONSTRUCTION

BACKGROUND OF THE INVENTION

1. Field of the Invention

This invention relates in general to valve sealing devices and in particular to a new and useful valve assembly including an insert for a conduit which includes a surrounding duct supporting a deformable insert therein which is engaged by a valve flap of a slightly largely diameter, the flap being pivoted on a pivot shaft which is located to one side of the flap.

2. Description of the Prior Art

The present invention refers particularly to the construction of a valve with a sealing duct which is supported in a conduit through which a fluid is adapted to pass. The construction refers in particular to a type of valve which includes an insert arranged at a spaced location from the interior wall of the conduit and which is made of a size which is slightly smaller than the diameter of the pivot flap valve so that a tight wedging action is effected with the valve flap when the valve is closed. The present invention is an improvement over the known construction particularly in respect to the formation of a continuous seal between the flap disk and the flexible insert. The construction of the invention also permits the formation of the valve flap with a short overall length.

SUMMARY OF THE INVENTION

The invention provides a valve flap construction for engagement with a deformable insert for sleeves which includes a supporting web structure on one side which provides a pivotal mounting for a flap valve disk. The support for the flap disk is formed on the side thereof which is remote from an overhung fastening provided for the flexible insert. The flexible insert is arranged within the duct in accordance with the invention in an overhung position on its one end face while the other end face is loosely fitted into a channel-shaped flange formation at one end of the connecting duct. The inner boundary of the flexible insert as well as the outer boundary of the flap disk comprise a planar or curved or a combination of a planar and curved partial surface.

The advantages of the invention is that a tight seal of the flap disk with the elastic insert is achieved by moving the pivot and the flap disk apart so that the pivot is mounted on one side of the disk. Due to the elastic construction of the insert, a tight fit of the extension of the edges of the flap disk is achieved, even with a small overall length. A short flexible insert is desirable not only because of the lower cost and the limited space which is usually available at the installation point but it is necessary particularly with a blocking pressure gradient which varies in direction. This is true because the insert is stressed for denting or deformation in one blocking direction and a flexible wall withstands this stress only with a short supporting length. The construction makes it possible to provide an adequate seal for the flap in the insert without having a special sealing element, and in the closed position of the flap valve the bearing or pivotal support for the flap is not exposed to the incoming pressure. The short overall length of the construction prevents any possible distortion by temperature influences.

Accordingly, it is an object of the invention to provide an improved valve insert and valve flap construction in which the valve flap is supported on the downstream or low pressure side by a pivot journal connected to the flap on this side and wherein the insert for the sealing engagement around the periphery of the flap is formed with a beaded end which fits within a groove of the receiving duct on one end and is loosely fitted within a receiving channel on the opposite end.

A further object of the invention is to provide a valve flap end and sealing insert construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE INVENTION

GENERAL DESCRIPTION OF THE PREFERRED EMBODIMENT

Figure 1:
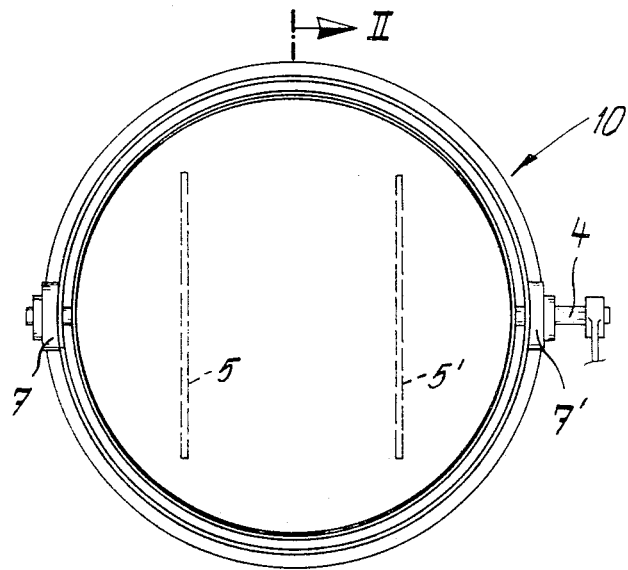
FIG. 1 is an upstream elevational view of a valve and insert construction of the invention.
Figure 2:
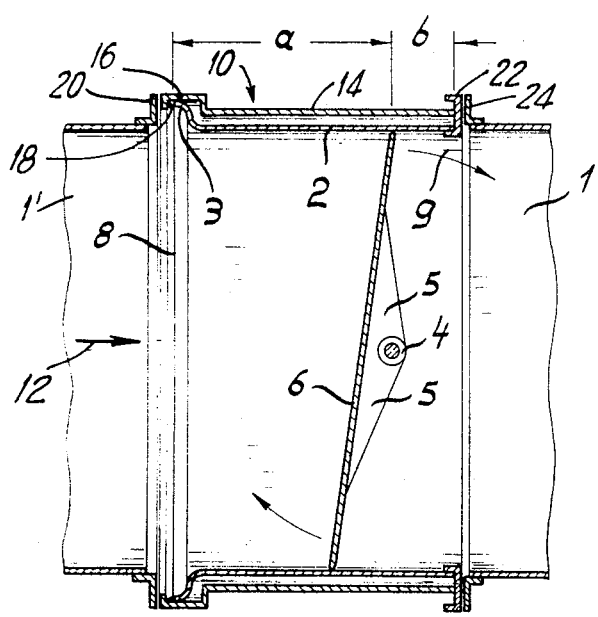
FIG. 2 is a section taken along the line II—II of FIG. 1.

Referring to the drawings in particular, the invention embodied therein comprises a flap valve and sealing insert construction generally designated 10 which is arranged within a flow duct which includes interrupted tubular parts 1 and 1' which normally have a flow therethrough in the direction indicated by the arrow 12. The assembly 10 includes an outer tubular duct wall forming portion 14 having a flange end 16 which forms an interior annular recess 18 and which is secured to the duct portion 1' by a collar 20 having an angle-shape cross section. The collar 20 is secured around the periphery of the duct 1', for example, by welding and is secured to an internal flange portion at the end of the flange part 16 of the outer duct forming part 14 by welding.

The opposite end of the outer duct forming part 14 is held within a channel member 22 which is secured to the duct 1 by an annular collar 24 of angle-shape cross section.

In accordance with the invention, the assembly 10 includes an insert 2 of a deformable material which has a beaded end portion 3 which is welded to the part 14 at its outer end which extends into the annular recess 18 at one end and holds the interior wall of the insert at a spaced location from the interior of the wall of the duct 14. The opposite end of the insert 2 is fitted into the channel 22.

In accordance with a further feature of the invention, the assembly 10 includes a valve flap 6 having a diameter which is slightly greater than the interior diameter of the insert 2 so that it may be wedged into engagement therewith by the deformation of the insert 2. With the construction of the invention, the flap is supported on a pivot shaft 4 which is journaled in parallel transversely spaced straps or webs 5,5' which are welded to the face of the flap valve 6 on the side which is downstream. The pivot shaft 4 is journaled at each side in journal bearing 7, 7' which are carried out in the exterior duct wall 14. It is not necessary to seal the shafts 4 at the location where they pass through the insert 2.

While a specific embodiment of the invention has been shown and described in detail to illustrate the application of the principles of the invention, it will be understood that the invention may be embodied otherwise without departing from such principles.

What is claimed is:

1. A valve insert assembly for arrangement in a flow duct comprising an outer tubular duct forming wall, a deformable uniformly concentric insert sleeve arranged within and extending substantially to and evenly spaced from the interior of said duct forming wall along the length thereof and including an end having a beaded formation extending radially outwardly and engaged against said duct forming wall and holding said insert in a spaced location from said duct forming wall, closing means closing said insert with said wall at the end opposite to said beaded formation end, a flap disk of a diameter slightly larger than the interior diameter of said insert sleeve, a pivot shaft for said flap disk concentrically journalled in said duct wall and connected to one side of said flap for concentric pivotal support of said disk in respect to said insert sleeve and being located on the downstream side thereof, said flap being engageable in a closed position with said insert sleeve intermediate its length at a spaced location from said beaded formation end; said beaded formation of said insert sleeve being located on the upstream side end, said tubular duct forming member having a flange at one end forming an interior radially outwardly extending groove, said insert sleeve having a beaded portion extending into the groove and holding the remaining portion of said insert sleeve away from the interior wall of said tubular duct forming member, a channel member secured to said duct forming member and adapted to be secured to the duct inwhich the assembly is to be positioned, and located at the downstream side of said flap valve and comprising said closing means, said insert sleeve having an end extending into said channel member.

2. A valve insert assembly for arrangement in a flow duct comprising an outer tubular duct forming wall, a deformable uniformly concentric insert sleeve arranged within and extending substantially to and evenly spaced from the interior of said duct forming wall along the length thereof and including an end having a beaded formation extending radially outwardly and engaged against said duct forming wall and holding said insert in a spaced location from said duct forming wall, closing means closing said insert with said wall at the end opposite to said beaded formation end, a flap disk of a diameter slightly larger than the interior diameter of said insert sleeve, a pivot shaft for said flap disk concentrically journalled in said duct wall and connected to one side of said flap for concentric pivotal support of said disk in respect to said insert sleeve and being located on the downstream side thereof, said flap being engageable in a closed position with said insert sleeve intermediate its length at a spaced location from said beaded formation end, said insert sleeve being secured on its one end face in an overhung position and the opposite end face is loose and is centered by said flap disk in the closed space.

* * * * *